(12) United States Patent
Bates et al.

(10) Patent No.: US 7,574,420 B2
(45) Date of Patent: Aug. 11, 2009

(54) INDEXING PAGES BASED ON ASSOCIATIONS WITH GEOGRAPHIC REGIONS

(75) Inventors: Cary Lee Bates, Rochester, MN (US); Brian Paul Wallenfelt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 11/282,092

(22) Filed: Nov. 17, 2005

(65) Prior Publication Data

US 2007/0112757 A1    May 17, 2007

(51) Int. Cl.
    *G06F 7/00*    (2006.01)
(52) U.S. Cl. .......................................................... 707/2
(58) Field of Classification Search ................... 707/2
    See application file for complete search history.

(56) References Cited

U.S. PATENT DOCUMENTS

| | | | |
|---|---|---|---|
| 6,285,999 B1 * | 9/2001 | Page | 707/5 |
| 7,231,405 B2 * | 6/2007 | Xia | 707/104.1 |
| 2005/0055271 A1 * | 3/2005 | Axe et al. | 705/14 |

* cited by examiner

*Primary Examiner*—Charles Rones
*Assistant Examiner*—Fazlul Quader
(74) *Attorney, Agent, or Firm*—Owen J. Gamon

(57) ABSTRACT

A method, apparatus, system, and storage medium that, in an embodiment, create an index for pages based on association scores for the pages with respect to geographic regions, where the association scores indicate relative degrees to which the pages are associated with the geographic regions. In an embodiment, the association scores are determined by adding a term scare to the association score if a term that is associated with the geographic region is present in the page. The term score indicates a relative degree to which presence of the term in the page indicates that the page is associated with the geographic region. In an embodiment, the association scores are further increased based on association scores of neighbor geographic regions and based on the association scores of incoming linked pages.

13 Claims, 5 Drawing Sheets

INDEXING PAGES BASED ON ASSOCIATIONS WITH GEOGRAPHIC REGIONS

FIELD

An embodiment of the invention generally relates to computers. In particular, an embodiment of the invention generally relates to creating an index for the searching of pages based on associations that the pages have with geographic regions.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated and complex computer software has evolved to take advantage of the higher performance of the hardware, resulting in computer systems today that are much more powerful than just a few years ago.

Years ago, computers were isolated devices that did not communicate with each other. But, today computers are often connected in networks, such as the Internet or World Wide Web, and a user at one computer, often called a client, may wish to access information at multiple other computers, often called servers, via a network. Searching is the primary mechanism used to retrieve information from the Internet. Users typically search the web pages of the Internet using a search engine, such as AltaVista, Yahoo, or Google. These search engines index hundreds of millions of web pages and respond to tens of millions of queries every day.

To accomplish this formidable task, search engines typically employ three major elements. The first is an agent, often called a spider, robot, or crawler. The crawler visits a web page, reads it, and then follows links to other pages within the site. The crawler typically returns to the site on a regular basis, such as every month or two, to look for changes. The crawler stores the information it finds in the second part of the search engine, which is the index. Sometimes new pages or changes that the crawler finds may take some time to be added to the index. Thus, a web page may have been "crawled" but not yet "indexed." Until the web page has been added to the index, the web page is not available to those searching with the search engine. Search engine software is the third part of a search engine. This is the program that interrogates the millions of pages recorded in the pre-created index to find matches to a search and ranks them in order of what the program believes is most popular, which is often referred to as the page rank. Page rank is extremely important to the user because a simple search using common terms may match thousands or even tens of thousands of pages, which would be virtually impossible for the user to individually sort through in an attempt to determine which pages best serves the user's needs.

In order to aid the user, search engines typically determine relevancy by following a set of rules, which are commonly known as a page-ranking algorithm. Exactly how a particular search engine's algorithm works is usually a closely-kept trade secret. But, all major search engines follow the same generally-accepted methods described below. One of the main methods in a page-ranking algorithm involves the location and frequency of keywords on a web page, which is known as the location/frequency method. For example, page-ranking algorithms often assume that terms appearing in a title control-tag are more relevant than terms appearing in other locations in the page. Further, many page-ranking algorithms will also determine if the search keywords appear near the top of a web page, such as in the headline or in the first few paragraphs of text. They assume that any page relevant to the topic will mention those words at the beginning. Frequency of terms is the other major factor that page-ranking algorithms use to determine relevancy. The page-ranking algorithm analyzes how often keywords appear in relation to other words in a web page and deems more relevant those with a higher frequency.

In addition to the location/frequency method, which is an on-the-page ranking criteria, search engines also typically make use of off-the-page ranking criteria. Off-the-page criteria are those that use data external to the page itself. Chief among these is link analysis. By analyzing how pages link to each other, the page-ranking algorithm attempts to determine the relative importance of the page with respect to other pages. For example, page-ranking algorithms typically assume that a page to which many other pages link is an important page and deserves to have a high page rank. In addition, some page-ranking algorithms use recursive page-ranking where the rank of the pages that link to the linked-to page also factor into the ranking of the linked-to page.

A problem with link analysis occurs with searches that attempt to find pages that are local to a particular area, such as a city. For example, when a user enters search terms for a service (e.g., a home builder, a plumber, or a real estate agent) and a city name, the pages with a high page rank are often not local to the searched-for city. For example, the first pages returned are not those for home builders who have an address within the city. Instead, the pages with a high page rank are referral services that merely mention the searched-for city, along with many other cities, and advertise that the referral service can recommend a home builder in the searched-for city. These referral service pages have a high page ranking because they are partners with many services around the country or around the world, who all link to the referral-service page. These many cross links cause the referral service to have a high page ranking that dominates any page ranking that the local service might have.

Thus, a need exists for a better technique for searching pages that are local to an area.

SUMMARY

A method, apparatus, system, and signal-bearing medium are provided that, in an embodiment, create an index for pages based on association scores for the pages with respect to geographic regions, where the association scores indicate relative degrees to which the pages are associated with the geographic regions. In an embodiment, the association scores are determined by adding a term score to the association score if a term that is associated with the geographic region is present in the page. The term score indicates a relative degree to which presence of the term in the page indicates that the page is associated with the geographic region. In an embodiment, the association scores are further increased based on association scores of neighbor geographic regions and based on the association scores of incoming linked pages. The index is created by selecting keywords that are present in the page, selecting weights for the keywords, finding the keywords that match the terms, and increasing the weights for the keywords that match the terms based on the association scores and the term scores. In this way, a search for a keyword may order the matching pages based on the weights, which are based on the degree to which the matching pages are associated with a geographic region.

DETAILED DESCRIPTION

Figure 1:
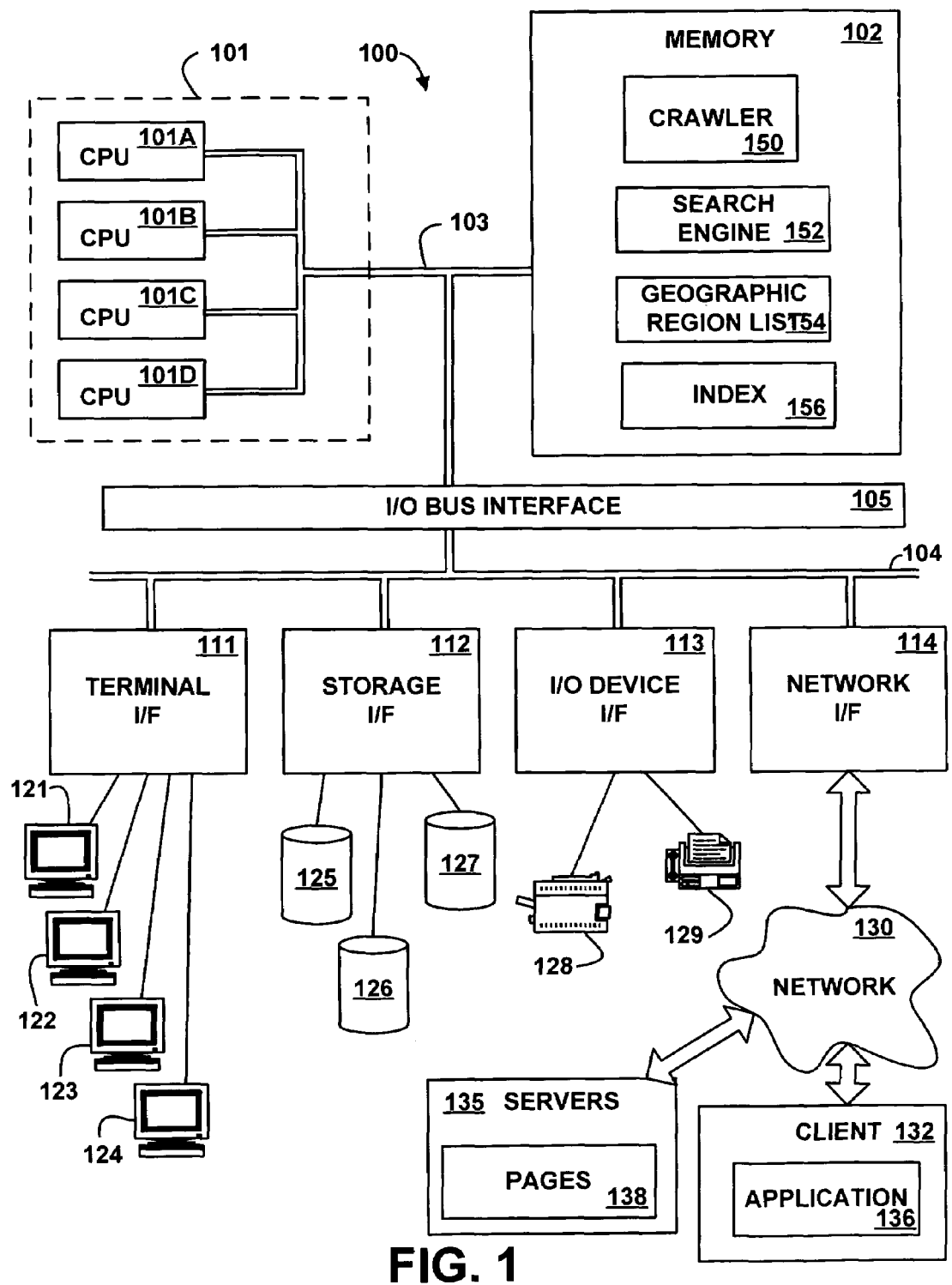
FIG. 1 depicts a block diagram of an example system for implementing an embodiment of the invention.

Referring to the Drawings, wherein like numbers denote like parts throughout the several views, FIG. 1 depicts a high-level block diagram representation of a computer system 100 connected to a client 132 and servers 135 via a network 130, according to an embodiment of the present invention. The use of "clients" and "servers" are for convenience only, and a computer system that acts as a client in one scenario may act as a server in another scenario, and vice versa. The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as a processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The memory 102 includes a crawler 150, a search engine 152, a geographic region list 154, and an index 156. Although the crawler 150, the search engine 152, the geographic region list 154, and the index 156 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the crawler 150, the search engine 152, the geographic region list 154, and the index 156 are illustrated as being contained within the main memory 102, these elements are not necessarily all completely contained in the same storage device at the same time.

In an embodiment, the crawler 150 and/or the search engine 152 include instructions capable of executing on the processor 101 or statements capable of being interpreted by instructions executing on the processor 101 to perform the functions as further described below with reference to FIGS. 4, 5, and 6. In another embodiment, the crawler 150 and/or the search engine 152 may be implemented in microcode. In another embodiment, the crawler 150 and/or the search engine 152 may be implemented in hardware via logic gates and/or other appropriate hardware techniques.

The geographic region list 154 includes information about geographic regions. The geographic region list 154 is further described below with reference to FIG. 3. The index 156 represents the pages 138. The index 156 is further described below with reference to FIG. 2. The crawler 150 builds the index 156 by retrieving the pages 138, examining their contents, and comparing their contents to the geographic region list 154. The search engine 152 searches for the pages 138 via the index 156 in response to keywords received from the clients 132.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127.

The I/O device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

The client 132 includes an application 136. The application 136 sends search requests with keywords to the search engine 152. In an embodiment, the application 136 may be implemented via a browser, but in other embodiments any appropriate application 136 may be used. The servers 135 include pages 138. The pages 138 may include any appropriate content that is capable of being searched via the search engine 152. In various embodiments, the pages 138 may be implemented via documents, files, objects, tables, databases, directories, subdirectories, or any portion or combination thereof and in some embodiments may include embedded control tags, statements, or logic. The client 132 and the servers 135 may also include any or all of the hardware and/or software elements previously described above for the computer system 100.

It should be understood that FIG. 1 is intended to depict the representative major components of the computer system 100, the network 130, the client 132, and the servers 135 at a high level, that individual components may have greater complexity than that represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127) or diskette; or (3) information conveyed to the computer system 100 by a communications medium, such as through a computer or a telephone network, e.g., the network 130.

Such tangible signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
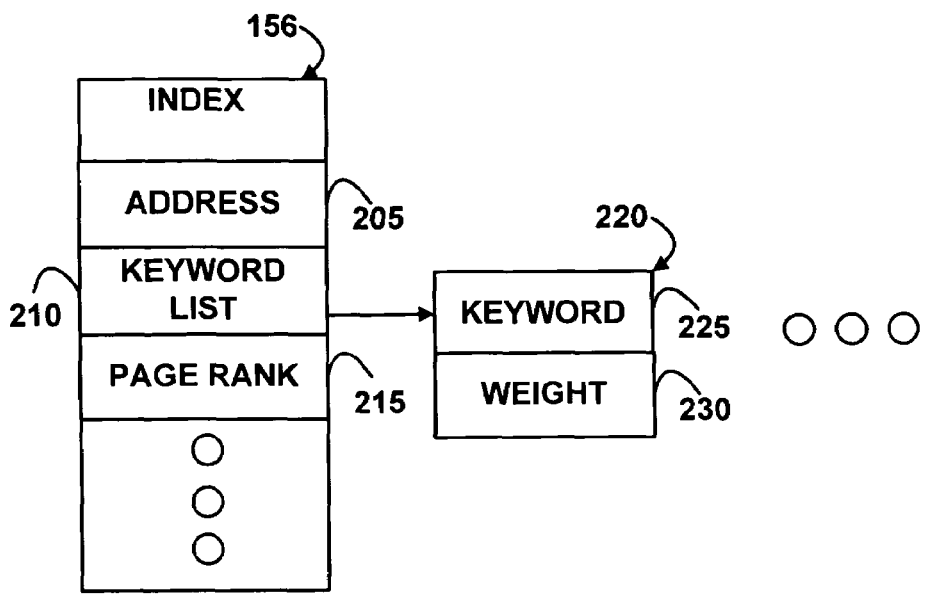
FIG. 2 depicts a block diagram of an example index, according to an embodiment of the invention.

FIG. 2 depicts a block diagram of an example data structure for the index 156, according to an embodiment of the invention. The index 156 includes an address 205, a keyword list 210, and a page rank 215 for each page 138. The keyword list 210 includes a list of keyword entries 220 for each keyword in the page 138. Each keyword entry 220 includes a keyword 225 and keyword weight 230. The address 205 includes the URL (Uniform Resource Locator) or other address of the page 138 at the servers 135. The keyword 225 includes a word or collections of words in the page 138. The weight 230 indicates the relative weight or importance of the keyword 225, as compared to other keywords 225. The page rank 215 indicates a relative importance of the page 138 indicated by the address 205, as compared to other pages 138.

Figure 3:
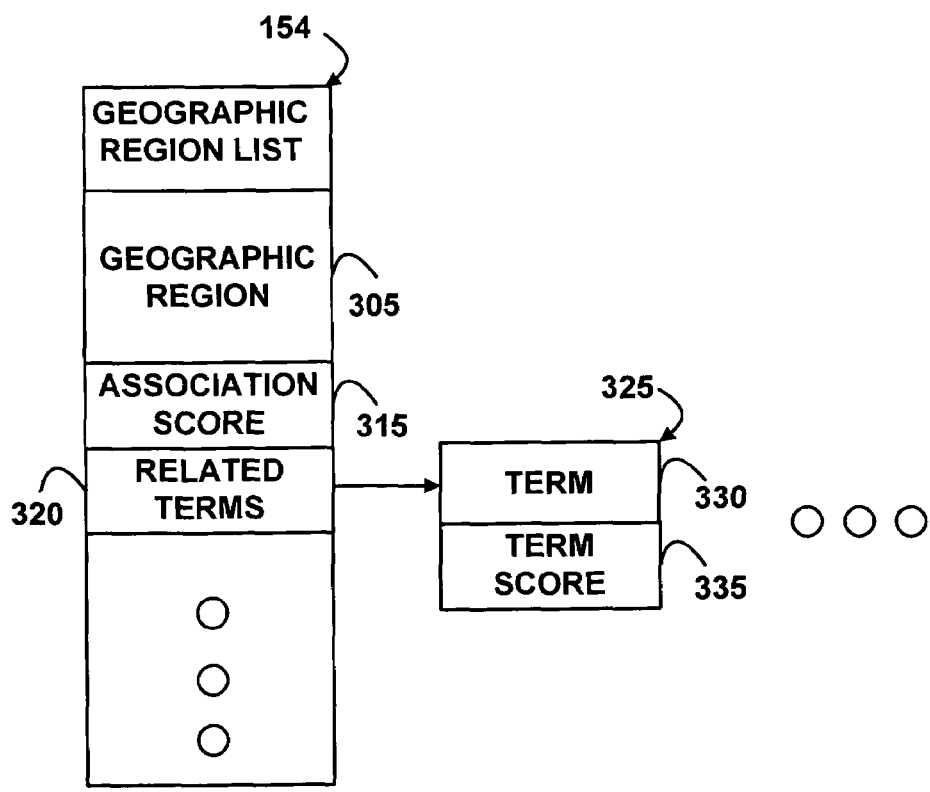
FIG. 3 depicts a block diagram of an example geographic region list, according to an embodiment of the invention.

FIG. 3 depicts a block diagram of an example data structure for the geographic region list 154, according to an embodiment of the invention. A geographic region list 154 exists for each crawled page 138. The geographic region list 154 includes geographic regions 305, an association score 315 for each geographic region 305, and related terms 320 for each geographic region. The geographic region 305 uniquely identifies a city or other geographic location or area and may include a city, a state, a zip code, a country, or any other appropriate identifying information. The association score 315 indicates the importance, degree, likelihood, or probability that a particular crawled page 138 contains content that is local to, or is associated with, the geographic region 305. The association score 315 for a crawled page 138 is calculated as further described below with reference to FIGS. 4 and 5.

The related terms 320 includes a list of term items 325. Each term item 325 includes a term 330 and a term score 335. The terms 330 are content (words, numbers, images, or audio) that, if present in a page 138, tend to indicate that the page 138 also includes other content that is local to, or is associated with, the geographic region 305. Examples of terms 330 include the name of the geographic region 305, the zip codes that serve the geographic region 305, the city, county, state, and/or country in which the geographic region 305 is located, the telephone area code and/or exchanges that serve the geographic region 305, a nickname or slogan of the geographic region 305, names of sports teams, names of educational institutions, street names, landmarks, or any other appropriate content. The terms 330 may include words, numbers, or expressions.

The term score 335 for an associated term 330 indicates the relative degree, importance, likelihood, or probability (relative to other of the terms 330) that the presence of the associated term 330 in the page 138 tends to indicate that the page 138 also includes other content that is associated with the geographic region 305. For example, a page 138 that includes a telephone number of a specific person may be more likely (and thus has a higher term score 335) to also include content associated with the geographic region 305 than a page that only includes the name of the geographic region 305.

In an embodiment, the terms 330 and their term scores 335 are predetermined by the designer of the geographic region list 154, the designer of the crawler 150, the designer of the search engine 152, the designer of the application 136, or via any appropriate technique.

Figure 4:
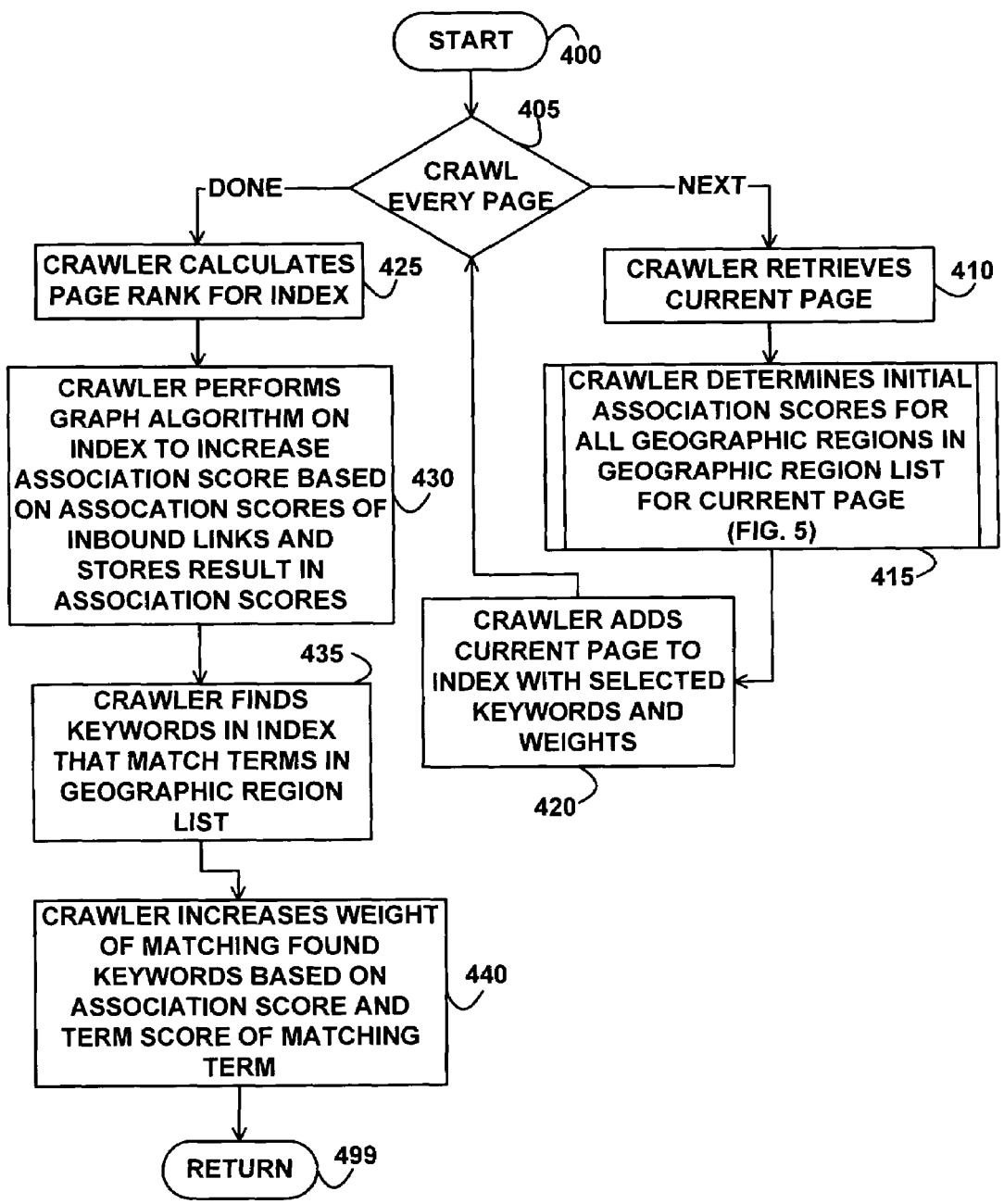
FIG. 4 depicts a flowchart of example processing for creating an index for pages based on association scores and term scores, according to an embodiment of the invention.

FIG. 4 depicts a flowchart of example processing for crawling the pages 138, creating an index 156 for the crawled pages 138 based on association scores 315 and term scores 335 according to an embodiment of the invention. The processing of FIG. 4 is performed periodically, so that the crawler 150 may crawl and process pages 138 that have been added or modified since the last time that the crawler 150 crawled the pages 138.

Control begins at block 400. Control then continues to block 405 where the crawler 150 enters a loop that is executed once for each page 138. The crawler 150 may crawl all pages 138 or a subset of the pages 138. So long as more pages 138 remain to be crawled, control continues from block 405 to block 410 where the crawler 150 retrieves the current page 138 from a server 135. Control then continues to block 415 where the crawler 150 determines the initial association scores 315 for all geographic regions 305 in the geographic region list 154 that is associated with the current page 138, as further described below with reference to FIG. 5.

Control then continues to block 420 where the crawler 150 adds the current page 138 to the index 156. Adding the current page 138 to the index 156 includes storing the address for the current page 138 in the address 205, storing the terms that exist in the current page 138 into the keywords 225 of the index 156, and calculating and storing the weights 230 for the terms that exist in the current page 138 into the weights 230 in the index 156. The crawler 150 may use any appropriate technique for selecting the keywords 225 and the weights 230. For example, in an embodiment the crawler 150 may choose to ignore short, common words in the page 138 (e.g., "a" "and," and "the"), and not store these words in the keywords 225. In an embodiment, the crawler 150 may select the weights 230 based on the location and/or frequency of the selected keywords 225. For example, the crawler 150 may assign higher weights 230 to those selected keywords 225 that are in the title of the page 150 and assign lower weights 230 to those keywords 225 that are at the bottom of the page 138. In an embodiment, the crawler 150 may assign higher weights 230 to those keywords 225 that are used more frequently in the page 139 while assigning lower weights 230 to those keywords 225 that are used less frequently in the page 138. But, in other embodiments, the crawler 150 may used any appropriate technique for selecting the terms from the page 138 to store in the keywords 225 and for selecting the weights 230 for those keywords 225. Control then returns to block 405 where the crawler 150 determines whether another page 138 exists to be crawled, as previously described above.

If the crawler 150 has crawled every page 138, then control continues from block 405 to block 425 where the crawler 150 calculates the page ranks 215 for every page 138 in the index 156. In an embodiment, the crawler 150 may use link analysis or any other appropriate technique for calculating all of the page ranks 215 for all the pages 138.

Control then continues to block 430 where the crawler 150 performs a graph algorithm on the index 156 and a graph of the outgoing links for every page in the index, which increases the association score 315 for a page based on the association scores of the pages that link to that page (the inbound links). The crawler 150 further stores the results of the graph algorithm in the association scores 315 for the page. A link is an address of a linked page that is embedded in a linking page that, when selected, causes the linked page to be retrieved. A URL (Uniform Resource Locator) is an example of a link, but in other embodiments any appropriate link may be used. Thus, the crawler 150 propagates the association scores 315 using a graph algorithm to determine the degree of local weighting, taking advantage of the fact that many pages that are from the same community link to other sites within the same community. For example, a local builder may link to the local lumberyard, the local plumber, the local electrician, and the local real estate agent, and the local builder may be linked to by the local Chamber of Commerce and the local builder's trade association. By determining how well a page is linked to by other pages that are also local to the community, an embodiment of the invention modifies the initial content-based association score 315 that was created by the processing of FIG. 5 to produce a new association score 315 for each geographic region.

In an embodiment, to determine the propagated association scores 315 for a page "A," all of the inbound links to the page A are utilized via the following example formulas:

$$AS(A,g_1)=(AS(t_1,g_1)/O(t_1)+ \ldots +AS(t_n,g_1)/O(t_n))$$

$$AS(A,g_m)=(AS(t_1,g_m)/O(t_1)+ \ldots +AS(t_n,g_m)/O(t_n))$$

where:

$t_1$-$t_n$ are the pages 138 that link to page A, i.e., pages $t_1$-$t_f$ are the inbound links to the page A;

O is the number of outbound links that the pages $t_1$-$t_n$ include;

$g_1$-$g_m$ are all possible geographic regions 305 that have an association score AS 315; and $AS(A,g_j)$ is the association score 315 for the page A based on a geographic region $g_j$, where j=1 to m. That is, $AS(A,g_j)$ is the likelihood, probability, strength, or degree to which the page A is local to, or is associated with, the geographic region $g_j$. Similarly, $AS(t_i,g_j)$ is the association score 315 for the page $t_i$ based on a geographic region $g_j$, where i=1 to n and j=1 to m.

Control then continues to block 435 where the crawler 150 finds the keywords 225 in the index 156 that match (are equal to) the terms 330 in the geographic region list 154. Control then continues to block 440 where the controller increases the weights 230 of the found keywords 225 based on the association score 315 of the geographic region 305 that has the matching terms 330 and based on the term scores 335 of the matching terms 330. In an embodiment, the crawler 150 increases the weights 230 of the found keywords 225 via the following example calculation:

$$W=W+[(T/M)*(A/S)*W], \text{ where}$$

W is the weight 230 of the keyword 225 that matches the term 330;

T is the term score 335 of the matching term 330;

M is the maximum term score 335 in the geographic region list 154 associated with the page 138 that contains the matching keywords 225;

A is the association score 315 of the geographic region 305 that has the matching term 330; and S is the sum of the term scores 335 in the geographic region list 154 for the matching term 330.

Control then continues to block 499 where the logic of FIG. 4 returns.

Figure 5:
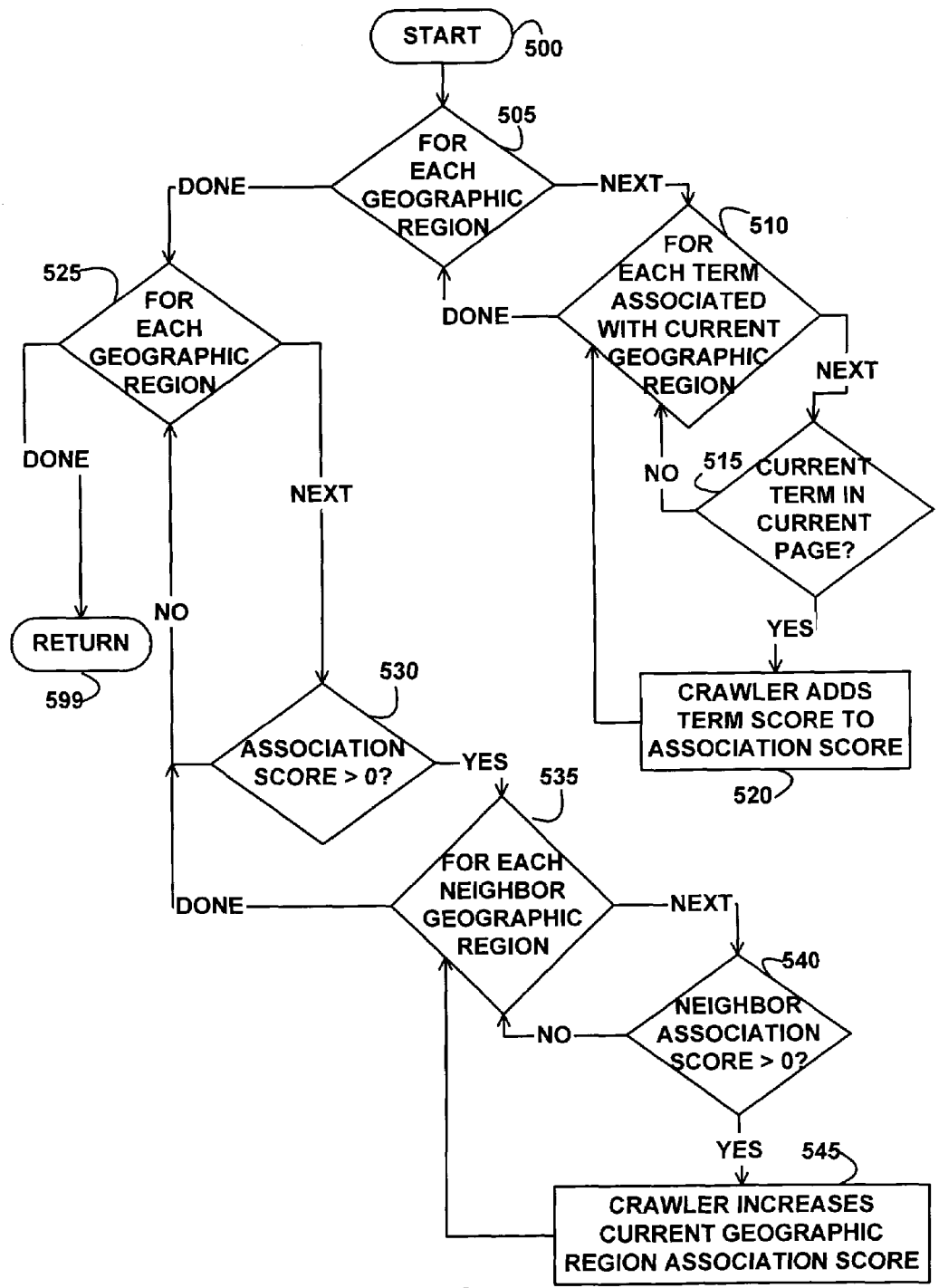
FIG. 5 depicts a flowchart of example processing for determining an initial association score, according to an embodiment of the invention.

FIG. 5 depicts a flowchart of example processing for determining an initial association score 315 for all geographic regions 305 in the geographic region list 154 that are associated with the current page 138, according to an embodiment of the invention. The current page 138 is passed to the logic of FIG. 5 by the invoker of the logic of FIG. 5, as previously described above with reference to FIG. 4.

Control begins at block 500. Control then continues to block 505 where the crawler 150 enters a loop that is executed once for each geographic region 305 in the geographic region list 154. So long as more geographic regions 305 remain to be processed, control continues from block 505 to block 510 where the crawler 150 enters a loop executed once for each term 330 associated with the current geographic region 305. So long as more terms associated with the current geographic region 305 remain to be processed, control continues from block 510 to block 515 where the crawler 150 determines whether the current term 330 is present in the current page 138.

If the determination at block 515 is true, then the current term 330 is present in the current page 138, so control continues to block 520 where the crawler 150 adds the term score 335 for the current term 330 that was found in the current page 138 to the association score 315 for the current geographic region 305. Control then returns to block 510 where the crawler 150 sets the current term 330 to be the next term 330 associated with the current geographic region 305 and determines whether all terms 330 associated with the current geographic region 305 have been processed by the loop, as previously described above.

If the determination at block 515 is false, then the current term 330 is not present in the current page 138, so control returns from block 515 to block 510 where the crawler 150 sets the current term 330 to be the next term 330 associated with the current geographic region 305 and determines whether all terms associated with the current geographic region 305 have been processed, as previously described above.

When all terms associated with the current geographic region 305 have been processed, then the loop that starts at block 510 is done, so control returns from block 510 to block 505 where the crawler 150 sets the current geographic region 305 to be the next geographic region 305 in the geographic region list 154 and determines whether the current geographic region 305 remains to be processed, as previously described above.

When all geographic regions 305 in the geographic region list 154 have been processed, then the loop that starts at block 505 is done, so control continues from block 505 to block 525 where the crawler 150 enters a loop that is executed once for each geographic region 305 in the geographic region list 154. So long as more geographic regions 305 remain to be processed, control continues from block 525 to block 530 where the crawler 150 determines whether the association score 315 for the current geographic region 305 is greater than zero.

If the determination at block 530 is true, then the association score 315 for the current geographic region 305 is greater than zero, so control continues from block 530 to block 535 where the crawler 150 starts a loop for each neighbor geographic region 305 of the current geographic region 305. In various embodiments, geographic regions 305 are neighbors if they are within a threshold distance of each other, within a threshold travel time, in the same zip code or delivery zone, on the same street or highway, in the same county, in the same time zone, in the same state, have the same telephone area code, have the same telephone area code and exchange, or any other appropriate criteria. So long as a next neighbor geographic region 305 exists for the current geographic region 305, control continues from block 535 to block 540 where the crawler 150 determines whether the association score 315 of the current neighbor geographic region 305 of the current geographic region 305 is greater than zero.

If the determination at block 540 is true, then the association score 315 of the current neighbor geographic region 305 is greater than zero, so control continues from block 540 to block 545 where the crawler 150 increases the association score 315 of the current geographic region 305. In an embodiment, the crawler 150 adds the association score 315 of the current neighbor geographic region 305 to the association score of the current geographic region 305, but in other embodiments, the crawler 150 may increase the association score 315 of the current geographic region 305 by any appropriate amount. Control then returns to block 535 where the crawler 150 sets the current neighbor geographic region 305 to be the next neighbor geographic region 305 and determines whether all neighbor geographic regions 305 have been processed, as previously described above.

If the determination at block 540 is false, then the association score 315 of the current neighbor geographic region 305 is not greater than zero, so control returns from block 540 to block 535, as previously describe above.

When all neighbor geographic regions 305 of the current geographic region 305 have been processed, then the loop that starts at block 535 is done, so control returns from block 535 to block 525 where the crawler 150 sets the current geographic region 305 to be the next geographic region 305 in the geographic region list 154 and determines whether all geographic regions 305 have been processed by the loop that starts at block 525, as previously described above.

If the determination at block 530 is false then the association score 315 of the current neighbor geographic region 305 to the current geographic region 305 is not greater than zero, so control returns to block 525, as previously described above.

When all geographic regions 305 in the geographic region list 154 have been processed by the loop that starts at block 525, then the loop that starts at block 525 is done, so control continues from block 525 to block 599 where the logic of FIG. 5 returns.

Figure 6:
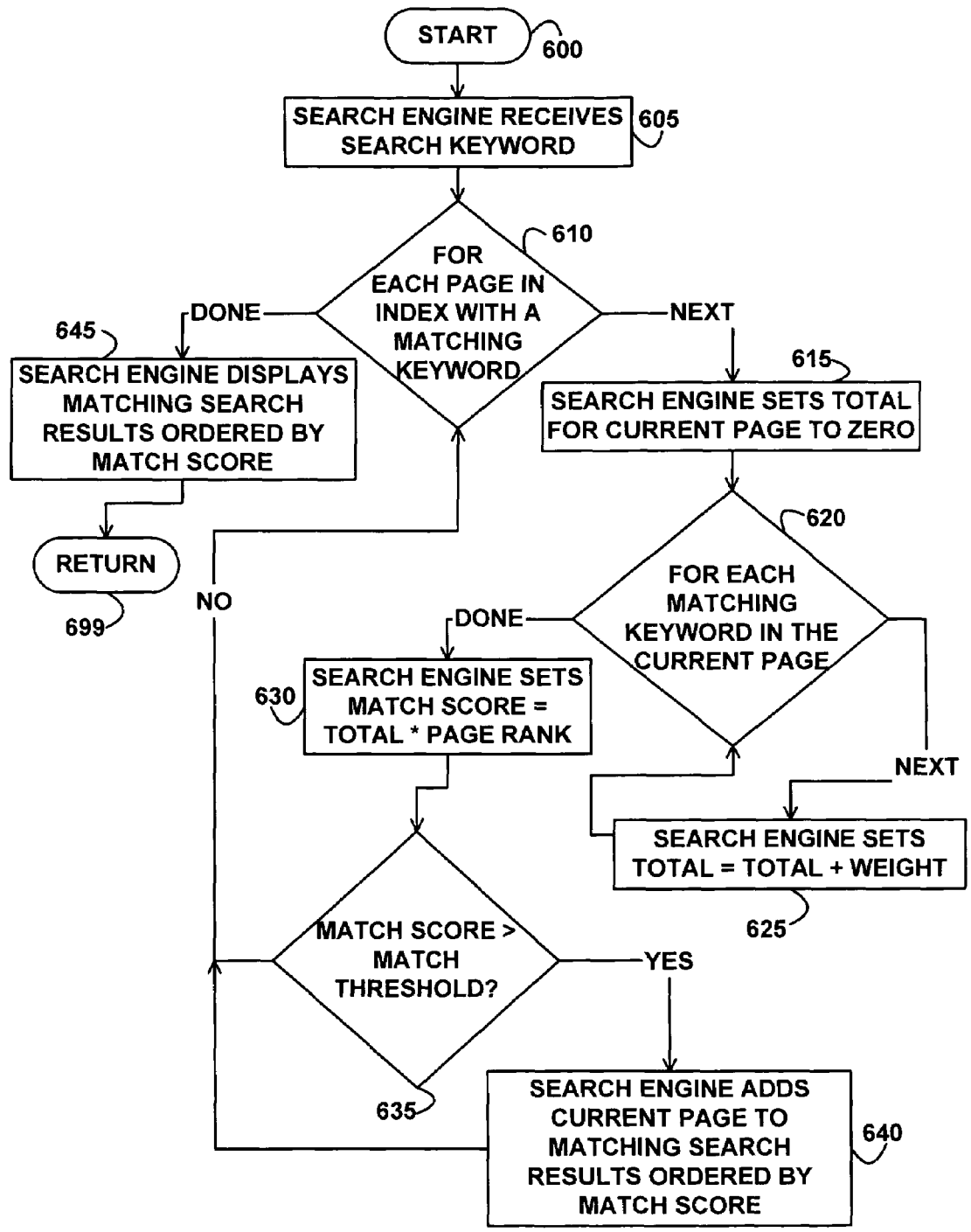
FIG. 6 depicts a flowchart of example processing for a search engine, according to an embodiment of the invention.

FIG. 6 depicts a flowchart of example processing for the search engine 152, according to an embodiment of the invention. Control begins at block 600. Control then continues to block 605 where the search engine 152 receives a search keyword from the application 136 at the client 132. Control then continues to block 610 where the search engine 152 enters a loop that executes once for each page 138 in the index 156 with a keyword 225 that matches (equals) the received search keyword. So long as a page 138 exists in the index 156 with a keyword 225 that matches the received search keyword, control continues from block 610 to block 615 where the search engine 152 sets a total for the current page 138 to zero.

Control then continues to block 620 where the search engine 152 enters a loop that executes once for each matching keyword 225 (that matches the received search keyword) in the current page 138. So long as a keyword 225 exists for the current page 138 that matches the received search keyword, control continues from block 620 to block 625 where the search engine 152 sets the total to be the total plus the weight 230 for the current matching keyword 225. Control then returns to block 620 where the search engine 152 sets the current matching keyword 225 to be the next matching keyword 225 in the current page 138 and determines whether all matching keywords 225 in the current page 138 have been processed.

When all matching keywords 225 for the current page 138 have been processed, the loop that starts at block 620 is done, so control continues form block 620 to block 630 where the search engine 152 sets the match score to be the total that was calculated by the loop that started at block 620 multiplied by the page rank 215 for the current page 138. Control then continues to block 635 where the search engine 152 determines whether the match score is greater than a match threshold.

If the determination at block 635 is true, then the match score is greater than a match threshold, so control continues from block 635 to block 640 where the search engine 152 adds the current page 138 to the matching search results, ordered by the match score. Control then returns to block 610 where the search engine 152 changes the current page 138 to be the next page 138 in the index 156 with a keyword 225 that matches the received search keyword, and determines whether all pages 138 with matching keywords 225 have been processed, as previously described above.

If the determination at block 635 is false, then the match score is not greater than the match threshold, so control returns from block 635 to block 610, as previously described above.

When all pages 138 in the index 156 with a keyword 225 that matches the received keyword have been processed by the loop that starts at block 610, then the loop that starts at block 610 is done, so control continues form block 645 where the search engine 152 displays the matching search results in the order specified by the match score. In an embodiment, the search engine 152 displays the matching search results by sending the matching search results to the application 136 at the client 132, which displays the matching search results. Control then continues to block 699 where the logic of FIG. 6 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A computer-implemented method comprising:
   determining a plurality of association scores for a plurality of pages with respect to a plurality of geographic regions, wherein the association score comprises a relative degree to which the page is associated with the geographic region, wherein the determining the plurality of association scores further comprises a term that is associated with the geographic region is present in content of the page and adding a term score to the association score, wherein the term score comprises a relative degree to which presence of the term in the content of the page indicates that the page is associated with the geographic region, wherein the term score of a telephone number is higher than the term score of a name of the geographic region, wherein the determining further comprises increasing the association score based on a neighbor association score of a neighbor geographic region, wherein the neighbor association score comprises a relative degree to which the page is associated with the neighbor geographic region; and creating an index for the plurality of pages based on the plurality of association scores, wherein the creating the index for the plurality of pages based on the plurality of association scores further comprises selecting a plurality of keywords present in the page, selecting a plurality of weights for the plurality of keywords, finding the keywords that match the terms, and increasing the plurality of weights for the keywords that match the terms based on the association score and the term scores, wherein the increasing the plurality of weights further comprises adding to the plurality of weights a result of multiplying the term scores of the terms that match the keywords by the association score of the geographic region that has the terms that match the keywords by the weight of the keywords that match the term, dividing by a maximum term score in the plurality of geographic regions that are associated with the page that contains the keywords that match the terms, and dividing by the sum of the term scores in the plurality of geographic regions for the terms that match the keywords.

2. The method of claim 1, wherein the geographic region and the neighbor geographic region are located within a threshold distance.

3. The method of claim 1, wherein the determining further comprises:
increasing the association score based on the association scores of incoming linked pages.

4. The method of claim 1, wherein the term comprises the name of the geographic region.

5. A storage medium encoded with instructions, wherein the instructions when executed comprise:
determining a plurality of association scores for a plurality of pages with respect to a plurality of geographic regions, wherein the association score comprises a relative degree to which the page is associated with the geographic region, wherein the determining the plurality of association scores further comprises a term that is associated with the geographic region is present in content of the page and adding a term score to the association score, wherein the term score comprises a relative degree to which presence of the term in the content of the page indicates that the page is associated with the geographic region, wherein the term score of a telephone number is higher than the term score of a name of the geographic region, wherein the determining further comprises increasing the association score based on a neighbor association score of a neighbor geographic region. wherein the neighbor association score comprises a relative degree to which the page is associated with the neighbor geographic region; and
creating an index for the plurality of pages based on the plurality of association scores, wherein the creating the index for the plurality of pages based on the plurality of association scores further comprises selecting a plurality of keywords present in the page, selecting a plurality of weights for the plurality of keywords, finding the keywords that match the terms, and increasing the plurality of weights for the keywords that match the terms based on the association score and the term scores, wherein the increasing the plurality of weights further comprises adding to the plurality of weights a result of multiplying the term scores of the terms that match the keywords by the association score of the geographic region that has the terms that match the keywords by the weight of the keywords that match the term, dividing by a maximum term score in the plurality of geographic regions that are associated with the page that contains the keywords that match the terms, and dividing by the sum of the term scores in the plurality of geographic regions for the terms that match the keywords.

6. The storage medium of claim 5, wherein the determining further comprises:
increasing the association score based on a neighbor association score of a neighbor geographic region, wherein the neighbor association score comprises a relative degree to which the page is associated with the neighbor geographic region.

7. The storage medium of claim 6, wherein the geographic region and the neighbor geographic region are located within a threshold distance.

8. The storage medium of claim 5, wherein the determining further comprises:
increasing the association score based on the association scores of incoming linked pages.

9. The storage medium of claim 5, wherein the term comprises the name of the geographic region.

10. A method for configuring a computer, comprising:
configuring the computer to determine a plurality of association scores for a plurality of pages with respect to a plurality of geographic regions, wherein the association score comprises a relative degree to which the page is associated with the geographic region, wherein the configuring the computer to determine the plurality of association scores further comprises a term that is associated with the geographic region is present in content of the page, and adding a term score to the association score, wherein the term score comprises a relative degree to which presence of the term in the content of the page indicates that the page is associated with the geographic region, wherein the term score of a telephone number is higher than the term score of a name of the geographic region, wherein the configuring the computer to determine further comprises configuring the computer to increase the association score based on a neighbor association score of a neighbor geographic region, wherein the neighbor association score comprises a relative degree to which the page is associated with the neighbor geographic region, wherein the geographic region and the neighbor geographic region are located within a threshold distance; and
configuring the computer to create an index for the plurality of pages based on the plurality of association scores, wherein the configuring the computer to create the index for the plurality of pages based on the plurality of association scores further comprises configuring the computer to select a plurality of keywords present in the page, configuring the computer to select a plurality of weights for the plurality of keywords, configuring the computer to find the keywords that match the terms, and configuring the computer to increase the plurality of weights for the keywords that match the terms based on the association score and the term scores, wherein the configuring the computer to increase the plurality of weights further comprises configuring the computer to add to the plurality of weights a result of multiplying the term scores of the terms that match the keywords by the association score of the geographic region that has the terms that match the keywords by the weight of the keywords that match the term, dividing by a maximum term score in the plurality of geographic regions that are associated with the page that contains the keywords that match the terms, and dividing by the sum of the term scores in the plurality of geographic regions for the terms that match the keywords.

11. The method of claim 10, wherein the configuring the computer to determine further comprises:

configuring the computer to increase the association score based on the association scores of incoming linked pages.

12. The method of claim 10, further comprising: configuring the computer to receive a search keyword;

configuring the computer to find the keywords in the index that match the search keyword;

configuring the computer to create search results, wherein the search results comprise the pages associated with the found keywords in the index; and configuring the computer to order the pages in the search results based on the weights.

13. The method of claim 12, wherein the configuring the computer to order the pages further comprises:

configuring the computer to order the pages in the search results based on a page rank.

* * * * *